US010039022B2

(12) United States Patent
Tsui et al.

(10) Patent No.: US 10,039,022 B2
(45) Date of Patent: Jul. 31, 2018

(54) REMOTE DIAGNOSIS AND CANCELLATION OF PASSIVE INTERMODULATION

(71) Applicants: AT&T Mobility II LLC, Atlanta, GA (US); AT&T Intellectual Property I, L.P., Atlanta, GA (US)

(72) Inventors: Ernest Tsui, Pleasanton, CA (US); Peter Richard Wong, Newark, CA (US); Paul Maxwell, Piedmont, CA (US); Young Suh, Danville, CA (US)

(73) Assignees: AT&T INTELLECTUAL PROPERTY I, L.P., Atlanta, GA (US); AT&T MOBILITY II LLC, Bedminster, NJ (US)

( * ) Notice: Subject to any disclaimer, the term of this patent is extended or adjusted under 35 U.S.C. 154(b) by 123 days.

(21) Appl. No.: 14/734,766

(22) Filed: Jun. 9, 2015

(65) Prior Publication Data

US 2016/0366605 A1    Dec. 15, 2016

(51) Int. Cl.
*H04W 24/08* (2009.01)
*H04B 17/345* (2015.01)
(Continued)

(52) U.S. Cl.
CPC ........ *H04W 24/08* (2013.01); *H04B 17/0085* (2013.01); *H04B 17/345* (2015.01); *H04B 17/3912* (2015.01)

(58) Field of Classification Search
CPC .............................. H04W 24/08; H04B 17/345
See application file for complete search history.

(56) References Cited

U.S. PATENT DOCUMENTS 5,365,516 A * 11/1994 Jandrell ................ G01S 5/0009
                                                    340/991
6,233,434 B1   5/2001 Takei
(Continued)

FOREIGN PATENT DOCUMENTS

CN    105991157 A    10/2016
CN    106301417 A     1/2017
(Continued)

OTHER PUBLICATIONS

L. Tarlazzi, "PIM Requirements Must Increase to Support Evolving DAS Systems", Commscope, Aug. 2014, 16 pgs.
(Continued)

*Primary Examiner* — Charles C Jiang
*Assistant Examiner* — Thad Defauw
(74) *Attorney, Agent, or Firm* — Amin, Turocy & Watson, LLP

(57) ABSTRACT

A passive intermodulation detection system is provided to remotely identify passive intermodulation at a base station site and diagnose the type of intermodulation and location of the non-linearity that is the source of the passive intermodulation. The passive intermodulation detection system can generate a test signal in a first band that is transmitted by an antenna. Another antenna can receive a signal in another band, and the passive intermodulation detection system can analysis the received signal to determine whether an intermodulation product due to a non-linearity is present. Based on the type of intermodulation product, period, order, frequency, and etc., the type and location of the non-linearity can be identified.

20 Claims, 11 Drawing Sheets

(51) Int. Cl.
*H04B 17/00* (2015.01)
*H04B 17/391* (2015.01)

(56) References Cited

U.S. PATENT DOCUMENTS

| | | | |
|---|---|---|---|
| 8,369,812 B2 | 2/2013 | Lehman | |
| 8,666,322 B1 | 3/2014 | Bradley et al. | |
| 8,831,593 B2 | 9/2014 | Melester et al. | |
| 8,855,175 B2 | 10/2014 | Wyville et al. | |
| 8,890,619 B2 | 11/2014 | Wyville | |
| 8,903,324 B1 | 12/2014 | Bradley | |
| 8,983,454 B2 | 3/2015 | Bevan et al. | |
| 9,026,064 B2 | 5/2015 | Wang et al. | |
| 9,391,719 B2 | 7/2016 | Neidhardt et al. | |
| 9,413,417 B2 | 8/2016 | Fleischer et al. | |
| 9,432,173 B2 | 8/2016 | Mao et al. | |
| 9,438,285 B2 | 9/2016 | Wyville | |
| 9,461,697 B2 | 10/2016 | Yu et al. | |
| 9,532,252 B2 | 12/2016 | Hariharan et al. | |
| 9,660,673 B2 | 5/2017 | Miao et al. | |
| 9,699,010 B2 | 7/2017 | Tobisu | |
| 2003/0232600 A1 | 12/2003 | Montgomery et al. | |
| 2009/0086864 A1 | 4/2009 | Komninakis | |
| 2009/0125253 A1 | 5/2009 | Blair et al. | |
| 2012/0295558 A1 | 11/2012 | Wang et al. | |
| 2013/0044791 A1* | 2/2013 | Rimini | H04B 1/109 375/219 |
| 2013/0054169 A1 | 2/2013 | Neidhardt et al. | |
| 2013/0310023 A1* | 11/2013 | Bevan | H04B 1/1027 455/423 |
| 2013/0322395 A1 | 12/2013 | Kazmi et al. | |
| 2014/0119197 A1* | 5/2014 | Maca | H04B 17/0085 370/241 |
| 2014/0153418 A1 | 6/2014 | Hariharan et al. | |
| 2014/0161005 A1 | 6/2014 | Laurent-Michel | |
| 2014/0242930 A1 | 8/2014 | Barker et al. | |
| 2014/0294052 A1* | 10/2014 | Currivan | H04B 3/46 375/224 |
| 2014/0378067 A1 | 12/2014 | Au | |
| 2015/0087242 A1 | 3/2015 | Bain et al. | |
| 2015/0145528 A1 | 5/2015 | Yeo et al. | |
| 2015/0222371 A1* | 8/2015 | Afkhami | H04B 17/16 455/67.13 |
| 2015/0244414 A1 | 8/2015 | Yu et al. | |
| 2015/0249965 A1* | 9/2015 | Dussmann | H03G 3/3042 455/501 |
| 2015/0318882 A1 | 11/2015 | Wyville | |
| 2015/0350940 A1* | 12/2015 | Wilson | H04W 52/243 370/252 |
| 2015/0358144 A1* | 12/2015 | Fleischer | H04B 17/104 370/242 |
| 2016/0006468 A1 | 1/2016 | Gale et al. | |
| 2016/0028497 A1 | 1/2016 | Holt et al. | |
| 2016/0072591 A1* | 3/2016 | Tu | H04B 1/525 455/63.1 |
| 2016/0142229 A1 | 5/2016 | Bevan et al. | |
| 2016/0322995 A1 | 11/2016 | Bevan et al. | |
| 2016/0366605 A1 | 12/2016 | Tsui et al. | |
| 2017/0064591 A1 | 3/2017 | Padfield et al. | |

FOREIGN PATENT DOCUMENTS

| | | |
|---|---|---|
| CN | 106330219 A | 1/2017 |
| EP | 2104266 A2 | 9/2009 |
| EP | 3176951 A1 | 4/2015 |
| WO | 2014085345 A1 | 6/2014 |
| WO | 2014166229 | 10/2014 |
| WO | 2016059424 | 4/2016 |
| WO | 2016059424 A1 | 4/2016 |
| WO | 2017072552 A1 | 5/2017 |
| WO | 2017091468 A1 | 6/2017 |

OTHER PUBLICATIONS

N. Cannon, "Troubleshooting Passive Intermodulation Problems in the Field", Anritsu America, http://www.anritsu.com/enUS/ProductsSolutions/Solution/Troubleshootingpassiveintermodulation.aspx, last accessed Mar. 19, 2015, 4 pgs.

Wilkerson et al., "Passive Intermodulation Distortion in Antennas," IEEE Transactions on Antennas and Propagation, Feb. 2015, pp. 474-482, vol. 63, No. 2, IEEE.

Yang et al., "PIM Interference Testing Methods of Satellite Communication Components and Setting up of the Testing System," General Assembly and Scientific Symposium (URSI GASS), 2014, IEEE, 4 pages.

Office Action for U.S. Appl. No. 15/179,427 dated Jan. 26, 2017, 16 pages.

Tian, et al."Adaptive suppression of passive intermodulation in digital satellite transceivers," Chinese Journal of Aeronautics, 2017, 7 pages.

Caratelli, et al. "Electromagnetic characterization of non linear Surfacesusing Impedance Boundary Conditions." Antennas and Propagation (EUCAP), Proceedings of the 5th European Conference on IEEE, 2011, 7 pages.

Kozlov, et al. "Passive Intermodulation of Analog and Digital Signalson Transmission Lines With Distributed Nonlinearities: Modelling andCharacterization." IEEE Transactions on Microwave Theory and Techniques, 2016, 3 pages, 64-5.

Notice of Allowance dated May 22, 2017 for U.S. Appl. No. 15/179,427, 24 pages.

Office Action for U.S. Appl. No. 15/640,382 dated Apr. 6, 2018, 26 pages.

* cited by examiner

REMOTE DIAGNOSIS AND CANCELLATION OF PASSIVE INTERMODULATION

TECHNICAL FIELD

The subject disclosure relates to remote diagnosis of passive intermodulation in a wireless communication environment.

BACKGROUND

Intermodulation is the amplitude modulation of signals containing two or more different frequencies in a system with non-linearities that results in signal noise. The intermodulation between each frequency component can form additional signals at frequencies that are harmonic frequencies and sum and difference frequencies of the original frequencies and multiples thereof. The non-linearities can be cause by junctions in the physical equipment (cables, antennas), as well as by sources in the surrounding environment. This type intermodulation, caused by non-active components, is called external (in the sense the passive intermodulation sources are external to the cabling/antenna system) passive intermodulation and can be difficult and costly to diagnose as site visits by skilled technicians are traditionally used to detect and identify the non-linearity source locations.

DETAILED DESCRIPTION

Figure 1:
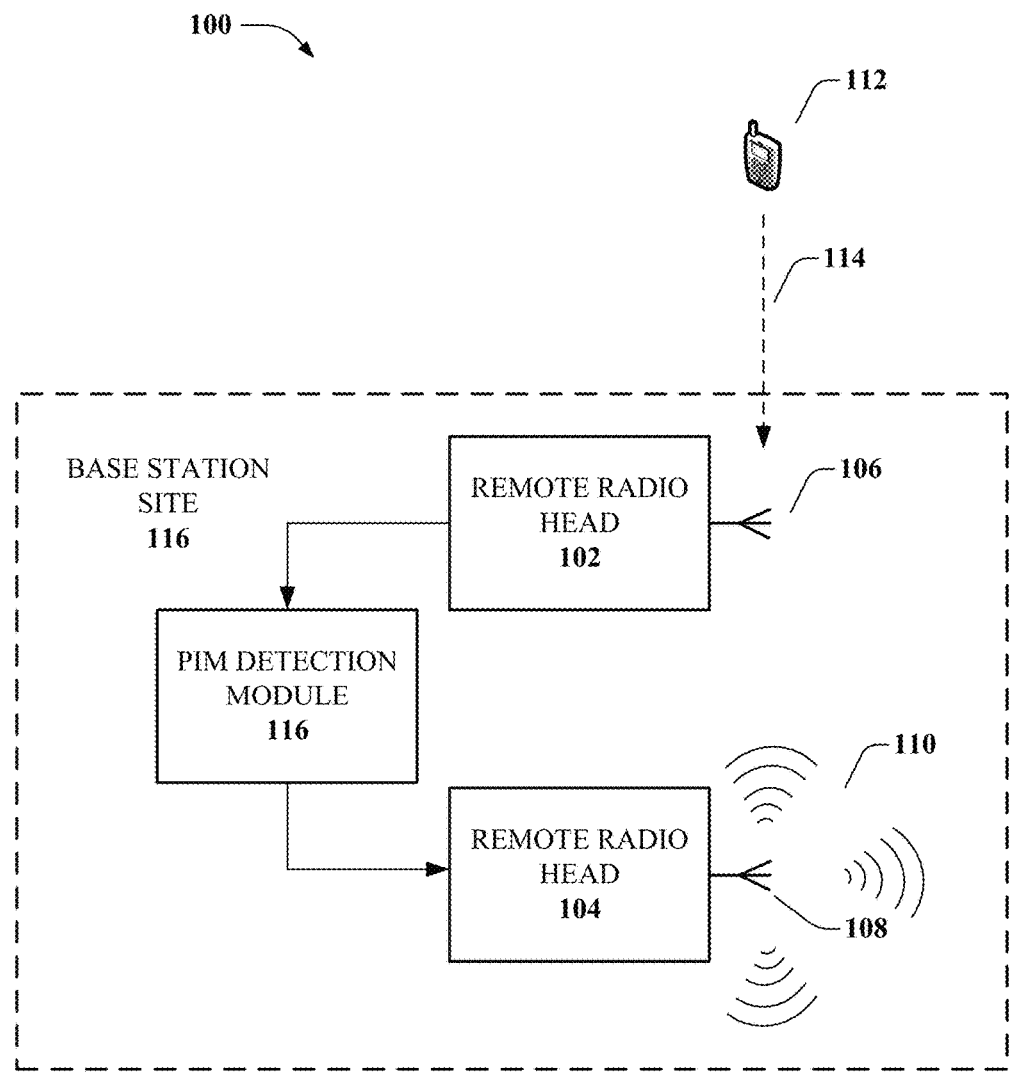
FIG. 1 is an example, non-limiting embodiment of a block diagram showing a passive intermodulation detection system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A passive intermodulation detection system is provided to remotely identify passive intermodulation at a base station site and diagnose the type of intermodulation and location of the non-linearity that is the source of the passive intermodulation. The passive intermodulation detection system can generate a test signal in a first band that is transmitted by an antenna. Another antenna can receive a signal in another band, and the passive intermodulation detection system can analyze the received signal to determine whether an intermodulation product due to an external or internal non-linearity is present. Based on the type of intermodulation product, period, order, frequency, and etc., the type and location of the non-linearity can be identified.

In an embodiment, the passive intermodulation detection system can also distinguish passive intermodulation noise from adjacent channel interference. The remote passive intermodulation test can generate a test signal that simulates a cellular signal at full or partial load and that does not impact existing customer site connections and usage so that the test can be performed while the base station device/cell tower is in service. Furthermore, using test signals that simulate spectrum-rich cellular transmissions can generate intermodulation products that would be generated during real-time use unlike single tone test signals of traditional passive intermodulation testers.

Once the characteristics of the passive intermodulation are discovered and analyzed, this information can then be used to effectively cancel the effect of the nonlinearities by use of the known characteristics of the test signals and the estimated characteristics of the nonlinearity sources.

For these considerations as well as other considerations, in one or more embodiments, a system comprises a processor and a memory that stores executable instructions that when executed by the processor, facilitate performance of operations, comprising cycling a test signal at a defined rate, wherein the test signal is in a first band and is transmitted by a transmitter. The operations also comprise receiving a transmission in a second band by a receiver. The operations also comprise determining that an intermodulation product from the test signal is present in the transmission based on matching a cyclical noise measurement of the transmission to the defined rate.

In another embodiment, a method comprises transmitting, by a device comprising a processor, a signal simulating a transmission to a mobile device cyclically at a predetermined periodicity, wherein the signal is in a first band and is transmitted via a transmitter. The method comprises receiving, by the device, a transmission in a second band by a receiver. The method also comprises determining, by the device, that an intermodulation product from the signal is present in the transmission based on matching a noise pattern of the transmission to the predetermined period of the signal.

In another embodiment, a computer-readable storage device storing executable instructions that, in response to execution, cause a device comprising a processor to perform operations comprising transmitting a test signal simulating a transmission to a mobile device cyclically according to a predetermined period, wherein the test signal is in a first band and is transmitted via a transmitter. The operations also comprise receiving a transmission in a second band by a receiver. The operations further comprise determining that an intermodulation product from the test signal is present in the transmission based on a match being determined between a noise pattern of the transmission and the predetermined period of the test signal.

Turning now to FIG. 1, illustrated is an example, non-limiting embodiment of a block diagram 100 showing a passive intermodulation detection system in a mobile broadband network in accordance with various aspects described herein.

A mobile broadband network generally comprises a radio access network that facilitates communications between the mobile devices and a core network. In the case of Long Term Evolution ("LTE") networks and other 3rd Generation Partnership Project ("3GPP") compliant networks (e,g., LTE Advanced) and even non-3GPP systems such as WiMAX and CDMA2000, these networks are the radio access network and an evolved packet core network that can contain a series of components that provide mobile data and control management. The passive intermodulation detection system disclosed herein can be utilized in any mobile network that includes base station devices and remote radio heads that may experience passive intermodulation, either external or internal. For the sake of simplicity, reference throughout this application will made to LTE and related networks.

A base station site 116 (e.g., a cell tower or other location where a base station device can be located) can include one or more remote radio heads (e.g., remote radio heads 102 and 104). Each of the remote radio heads 102 and 104 can send transmissions to one or more mobile devices (e.g., mobile device 112) that are located within range of the base station site 116. Non-linearities in passive elements (e.g., antennas, cabling, junctions between materials, etc.) can cause passive intermodulation when two or more high power tones mix at the non-linearities (e.g., junctions of dissimilar metals, metal-oxide junctions and even loose connectors). Since passive intermodulation is dependent on the frequencies and amplitudes of signals being transmitted, detecting passive intermodulation under conditions that are similar to normal operating conditions is ideal.

Since the remote radio heads are often each communicating with multiple mobile devices simultaneously, a system for detecting passive intermodulation while both remote radio heads 102 and 104 are operating is disclosed herein. Passive intermodulation detection module 116 can generate a test signal 110 that can be transmitted by remote radio head 104 via antenna 108. The test signal 110 can be a signal that includes transmissions at a plurality of frequencies simulating a transmission sent by the remote radio during normal operations. Meanwhile, the other remote radio head 102 can receive a signal 114 in a band that is different than the test signal 110. The test signal can be in a downlink band, while the signal 114 received by the remote radio head 102 via antenna 106 can be from a mobile device 112 in an uplink band.

The passive intermodulation detection module 116 can detect whether the signal 114, as received by the remote radio head 102 includes any intermodulation products from passive intermodulation at the base station site 116. In an embodiment, the test signal 110 generated by the test signal generator in the passive intermodulation detection module 116 can be cycled at a defined rate, and the intermodulation products in the received signal 114 can be identified as noise measurements that cycle at the same rate as the test signal 110.

In an embodiment, the passive intermodulation detection module 116 can also identify the location, or distance of the non-linearity source, based on a time delay between when the intermodulation products show up as noise measurements in the received signal 114 and when the test signal 110 starts or on a phase difference between the intermodulation product and the test signal. The passive intermodulation detection module 116 can also determine what type of non-linearity is the cause of the passive intermodulation based on the amplitudes and the frequencies of the intermodulation products in the noise measurement.

In an embodiment, the passive intermodulation detection module 116 can also transmit the test signal 110 to one or more sectors sequentially or simultaneously. In some embodiments, that may mean the different antennas transmit the test signal and in some embodiments, a set of remote radio heads transmit the test signal 110 sequentially. In an embodiment, remote radio head 102 may transmit the test signal 110, and remote radio head 104 can receive the signal 114 from the mobile device 112. In other embodiments, the passive intermodulation detection module 116 can also cycle the load of the test signal 110 from a partial load or power up to a full load or power with a predetermined number of increments. The passive intermodulation detection module 116 can determine whether the non-linearities in or around the base station site 116 that give rise to the passive intermodulation have a threshold load below which intermodulation products are non-existent or a small enough that their interference effects on the noise profile of the signal 114 is negligible.

Figure 2:
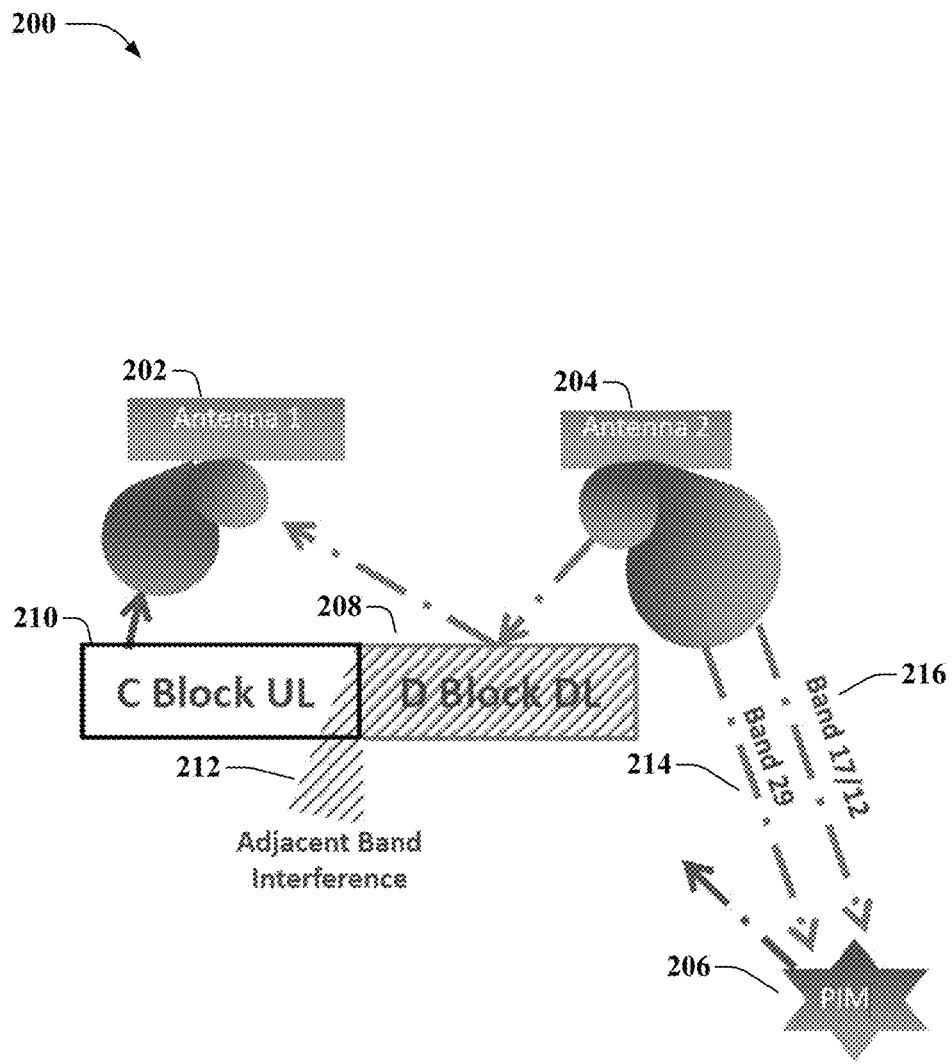
FIG. 2 is an example, non-limiting embodiment of a block diagram showing uplink passive intermodulation in accordance with various aspects described herein.

Turning now to FIG. 2, illustrated is an example, non-limiting embodiment of a block diagram 200 showing uplink passive intermodulation in accordance with various aspects described herein.

An antenna 204 can transmit one or more transmissions (e.g., transmission 214 in band 29 and a transmission 216 in band 17 or 12). It is also shown that even broadband transmissions within a given band can interact with a nonlinearity but also multiple transmissions such as 214 and 216 can interact with a nonlinearity and cause passive intermodulation 206. Non-linearities in passive elements (e.g., antennas, cabling, junctions between materials, etc.) can cause passive intermodulation when two or more high power tones mix at the non-linearities (e.g., junctions of dissimilar metals, metal-oxide junctions and even loose connectors). Since passive intermodulation is dependent on the frequencies and amplitudes of signals being transmitted, detecting passive intermodulation under conditions that are similar to normal operating conditions is ideal.

Since the remote radio heads are often each communicating with multiple mobile devices simultaneously, a system for detecting passive intermodulation while both antennas 202 and 204 are operating is disclosed herein. The antenna 204 can transmit a test signal via both transmissions 214 and 216. The test signal can be a signal that includes transmissions at a plurality of frequencies simulating a transmission sent by the remote radio during normal operations. In an embodiment, the transmissions 214 and 216 can be in a D block downlink 208. Meanwhile, antenna 202 can receive an uplink transmission 210 in a C block, and the C block transmission 210 can include intermodulation products from the passive intermodulation 206 as well as adjacent channel interference 212 from the D block downlink 208.

A passive intermodulation detection system can detect whether the C block uplink 210, as received by the antenna 202 includes any intermodulation products from passive intermodulation 206. In an embodiment, the transmissions 214 and 216 generated by a test signal generator (not shown) in the passive intermodulation detection system can be cycled at a defined rate, and the intermodulation products in the received signal 210 can be identified as noise measurements that cycle at the same rate as transmissions 214 and 216. Cycling the test signal generator can facilitate easily distinguishing the cause (test signal) and effect (intermodulation product) when the test signal generator cycles on and off repeatedly.

In an embodiment, the passive intermodulation detection system can also distinguish the adjacent band interference 212 (that can be amplified by intermodulation products caused by PIM) from the passive intermodulation 206 due to mixing from both carriers. Since the D block downlink 208 is adjacent to the C block uplink 210 in the frequency domain, there is naturally some noise that appears on the C block uplink 210 just from having the test signals 214 and 216 in the adjacent band. Therefore, the passive intermodulation detection system can distinguish the PIM 206 from the adjacent band interference 212. The passive intermodulation detection system can distinguish adjacent band interference 212 based on the slope of the noise amplitude as a function of frequency. The further the frequency is from the D block downlink 208, the noise amplitude decreases. By contrast, the intermodulation product from the passive intermodulation 206 has harmonics that show up as increases at a predetermined frequency gaps. These frequency gaps are the period of the intermodulation products. In some embodiments intermodulation products can be 3rd order or higher harmonics.

Figure 3:
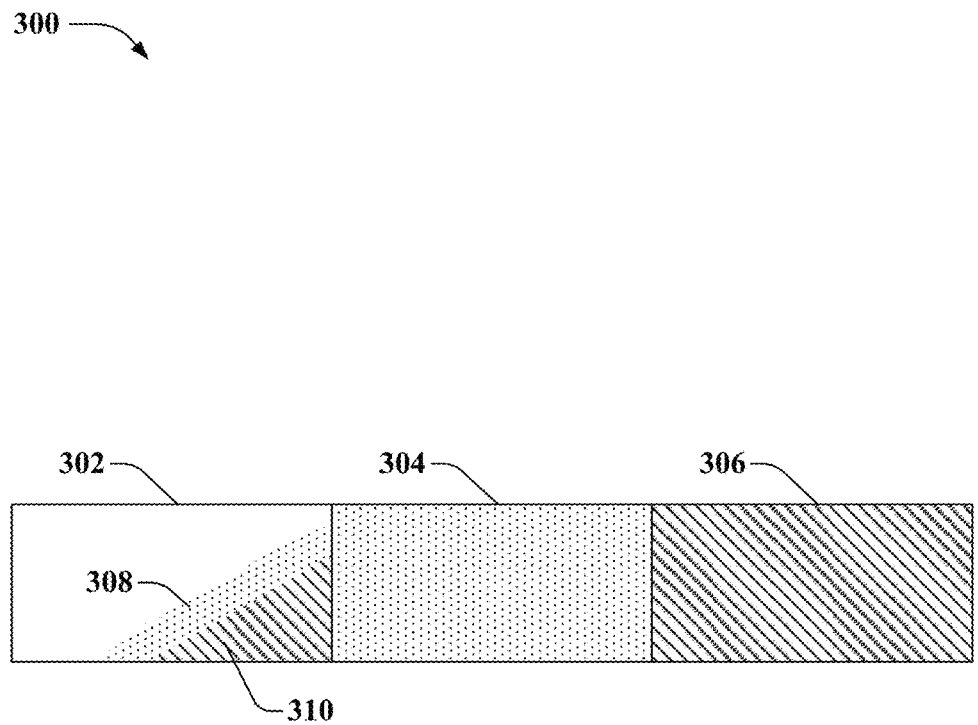
FIG. 3 is an example, non-limiting embodiment of a block diagram showing passive intermodulation and adjacent channel interference in accordance with various aspects described herein.

Turning now to FIG. 3, illustrated is an example, non-limiting embodiment of a block diagram 300 showing passive intermodulation and adjacent channel interference in accordance with various aspects described herein.

Diagram 300 provides a visual representation of how adjacent channel interference can be distinguished from passive intermodulation. In the embodiment shown in FIG. 3, a downlink transmission in band 306 can generate passive intermodulation that is noticeable even in band 302 that is not adjacent to band 306. In this embodiment, band 306 is a downlink band (e.g., A, B, or C) while band 304 is an downlink transmission in an adjacent band (e.g., Band D or E). In band 302, which can be an uplink in band A, B, or C, adjacent channel interference 308 which is rolloff interference from band 304 can be noticed, but additionally, interference caused by passive intermodulation 310 can also be identified.

The passive intermodulation detection system disclosed herein can distinguish adjacent band interference 308 based on the slope of the noise amplitude as a function of frequency. The further the frequency is from the band 304, the noise amplitude decreases. By contrast, the intermodulation product from the passive intermodulation 310 has harmonics that show up as increases at a predetermined frequency gaps. These frequency gaps are the period of the intermodulation products. In some embodiments intermodulation products can be 3rd or even higher order odd harmonics.

Figure 4:
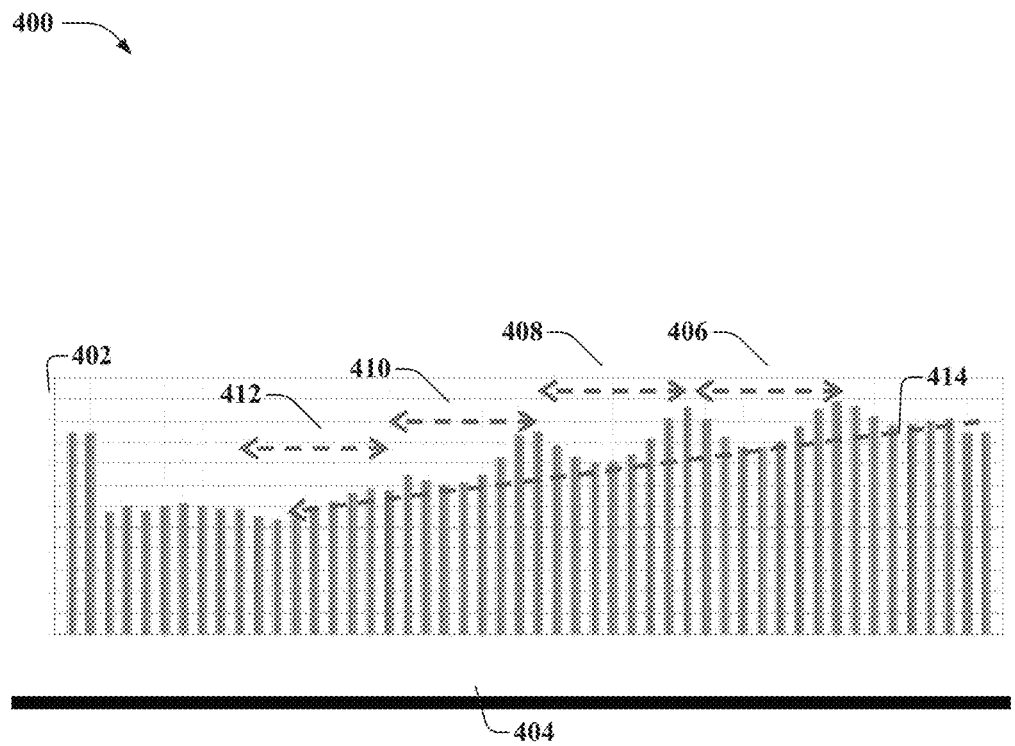
FIG. 4 is an example, non-limiting embodiment of a block diagram showing passive intermodulation and adjacent channel interference in accordance with various aspects described herein.

Turning now to FIG. 4, illustrated is an example, non-limiting embodiment of a block diagram 400 showing passive intermodulation and adjacent channel interference in accordance with various aspects described herein.

Diagram 400 provides another visual representation of how adjacent channel interference can be distinguished from passive intermodulation. In the embodiment shown in FIG. 4, the slope 414 represents the adjacent channel interference from an adjacent band that gently decreases as a function of frequency range from the adjacent channel, whereas 412, 410, 408, and 406 represent periods of harmonic noise peaks that are due to passive intermodulation. In diagram 400, the axis 402 represents interference power, while the axis 404 represents a range of frequencies in a band.

Figure 5:
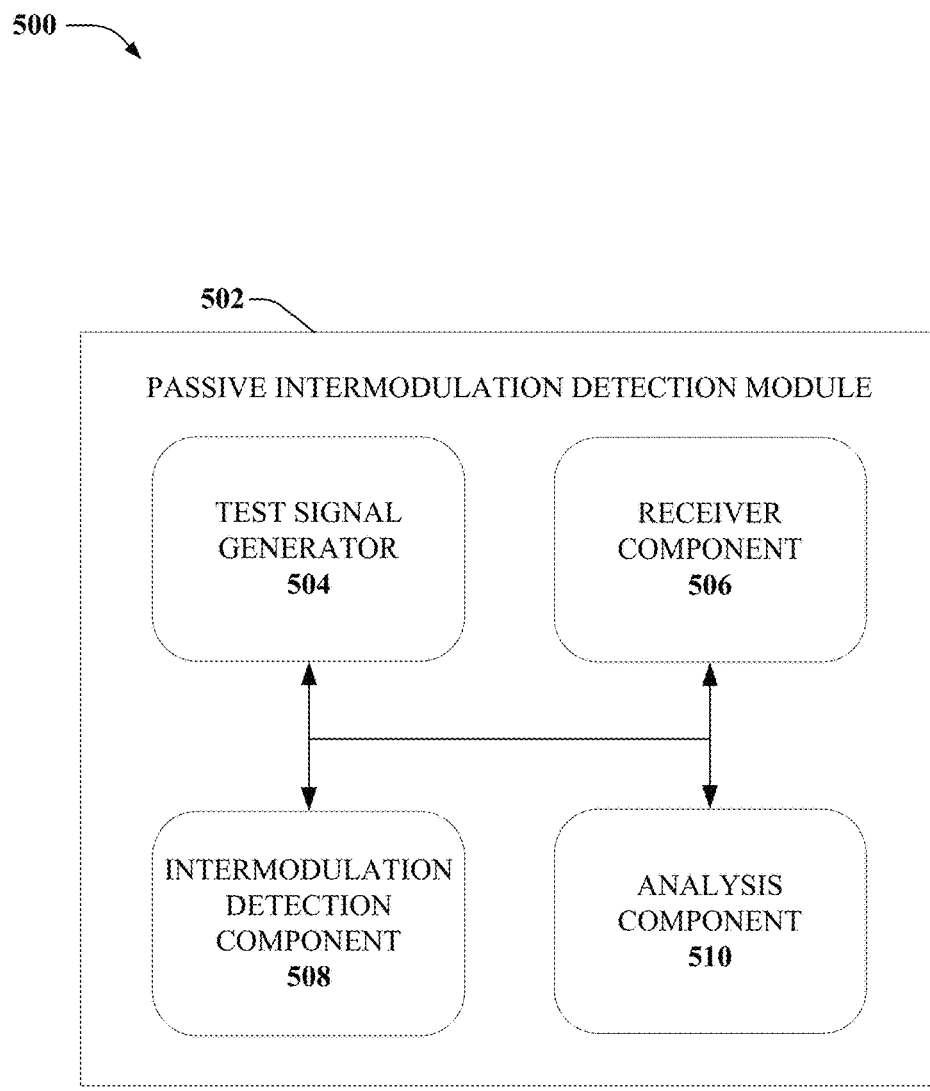
FIG. 5 is an example, non-limiting embodiment of a block diagram showing a passive intermodulation detection module in accordance with various aspects described herein.

Turning now to FIG. 5, illustrated is an example, non-limiting embodiment of a block diagram 500 showing a passive intermodulation detection module 502 in accordance with various aspects described herein.

A base station site (e.g., a cell tower or other location where a base station device can be located) can include one or more remote radio heads that can send transmissions to one or more mobile devices that are located within range of the base station site. Non-linearities in passive elements (e.g., antennas, cabling, junctions between materials, etc.) can cause passive intermodulation when two or more high power tones mix at the non-linearities (e.g., junctions of dissimilar metals, metal-oxide junctions and even loose connectors).

Passive intermodulation detection module 502 can be configured to detect passive intermodulation caused by non-linearities at the cell site. A test signal generator 504 can generate a test signal that can be transmitted by an antenna. The test signal can be a signal that includes transmissions at a plurality of frequencies simulating a transmission sent by the remote radio during normal operations. The test signal generator 504 can cycle the test signal at a defined rate and the test signal can be in a first band.

Receiver component 506 can receive, via another antenna, a transmission in a second band. The test signal can be in a downlink band, while signals received by the receiver component 506 can be from a mobile device in an uplink band.

An intermodulation detection component 508 can detect whether the signal, as received by the receiver component 506 includes any intermodulation products from passive intermodulation. In an embodiment, the intermodulation detection component 508 can determine that an intermodulation product from the test signal is present in the transmission based on matching a cyclical noise measurement of the transmission to the defined rate of the test signal. The intermodulation detection component 508 can also distinguish the intermodulation product from adjacent channel interference associated with a signal on an adjacent channel based on the slope of the noise amplitude as a function of frequency. The further the frequency is from the adjacent band, the noise amplitude decreases. By contrast, the intermodulation product from the passive intermodulation has harmonics that show up as increases at regular frequency intervals.

In an embodiment, the analysis component 510 can determine a type of a source of non-linearity based on an amplitude and a period of the intermodulation product. This can also determine characteristics of the nonlinearity for use in possible cancellation. The analysis component 510 can also determine a location of the source of non-linearity based on a time delay between the intermodulation product and the test signal. The analysis component 510 can also generate a model of the intermodulation products created by the non-linearity that is predictive of intermodulation products in different contexts (band, frequency, amplitude, etc.). This model can then be used by the analysis component 510 to modify or otherwise process transmissions to mitigate the intermodulation product on transmissions received by receiver component 506.

The test signal generator 504 can also cycle the test signal to each sector of the cell site, and the analysis component 510 can determine roughly where the non-linearities are that cause the passive intermodulation based on which of the cycled test signals correspond to the passive intermodulation. As an example, if while cycling the test signal to a first and second sectors, no passive intermodulation is detected, but passive intermodulation is detected while transmitting the test signal to the third sector, the analysis component 510 can determine that the non-linearity is likely somehow associated with the third sector antennas or remote radio heads. Also, the interaction of bands/carriers between sectors can be distinguished, for example, if a carrier from one sector interacts with another mixing carrier from the second sector, this effect can be diagnosed from the above procedures as well and similar variations involving more than 2 carriers and more than 2 sectors are diagnosable in this manner as well.

In other embodiments, the test signal generator 504 can also cycle the load of the test signal from a partial load or no load up to a full load with a predetermined number of increments. The intermodulation detection component 508 or the analysis component 510 can determine whether the non-linearities in or around the base station site that give rise to the passive intermodulation have a threshold load below which intermodulation products are non-existent or a small enough that their interference effects on the noise profile of the received signal is negligible.

Figure 6:
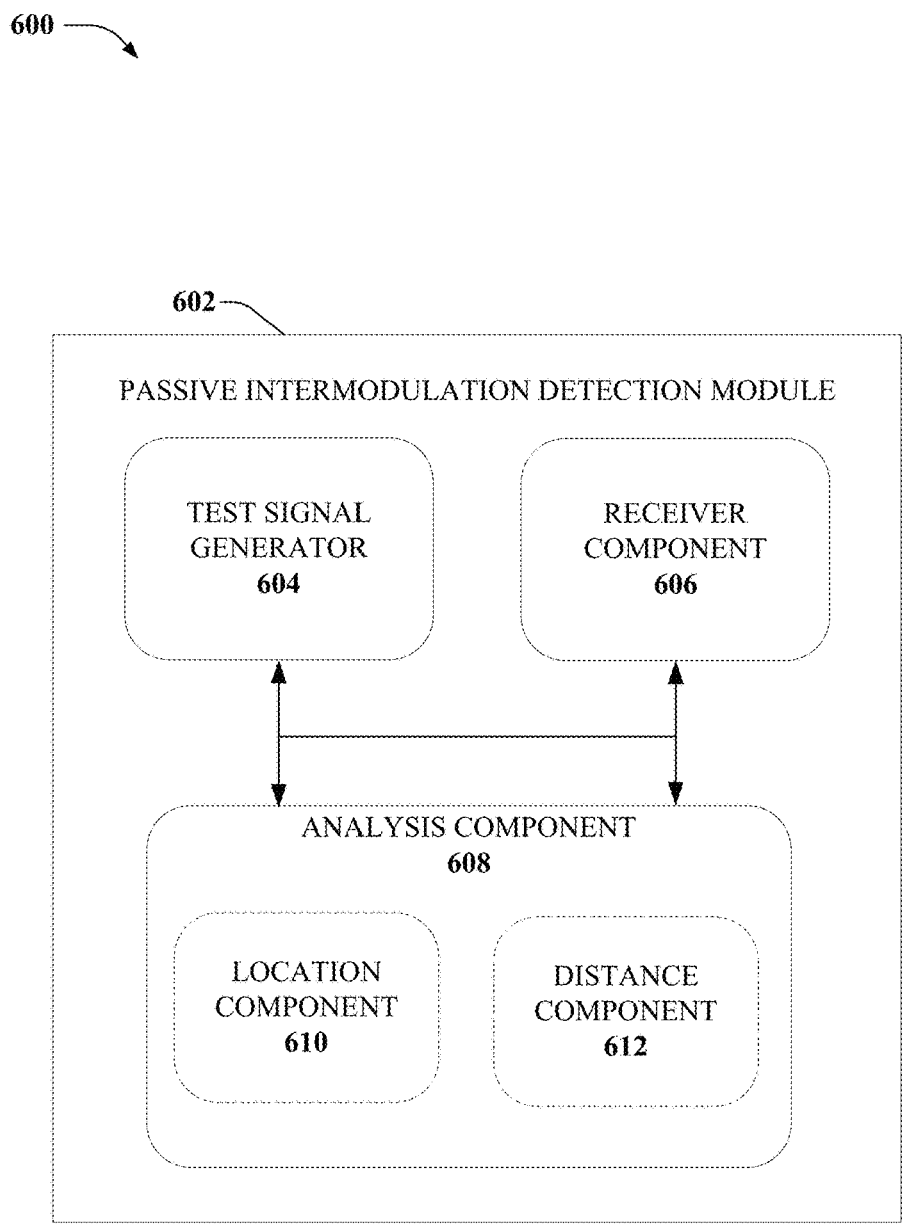
FIG. 6 is an example, non-limiting embodiment of a block diagram showing a passive intermodulation detection module in accordance with various aspects described herein.

Turning now to FIG. 6, illustrated is an example, non-limiting embodiment of a block diagram 600 showing a passive intermodulation detection module 602 in accordance with various aspects described herein A test signal generator 604 can generate a test signal that can be transmitted by an antenna and the receiver component 606 can receive, via another antenna, a transmission in a band from the test signal. The test signal can be in a downlink band, while the signal received by the receiver component 606 can be from a mobile device in a uplink band.

The analysis component 608 can include a location component 610 that can determine a rough location of the nonlinearity causing the passive intermodulation based on matching the passive intermodulation to a sector in which the test signal was transmitted. The distance component 612 can also determine a location of the source of non-linearity based on a time delay between the intermodulation product and the test signal. This time delay can be extracted by any number of approaches, one of which is to examine the phase vs. frequency characteristic of the Fourier Transform of the received intermodulation interference signal during a maintenance window (when there are few if any signals being transmitted) and determine the relative time of the interference vs. the test signal. In some embodiments, a radial distance from the receiving antenna can be determined. This radial distance can be further refined by intermodulation source reception from other antennas such that intersection of radial distances from separated antennas may be used to further locate possible sources of interference.

In an embodiment, based on the estimated location of the source of the non-linearity and the measured intermodulation products, the analysis component can generate an intermodulation product model that can be used to mitigate or cancel the effects of intermodulation product in received signals. The known properties of the test signal will also be exploited in this process.

Figure 7:
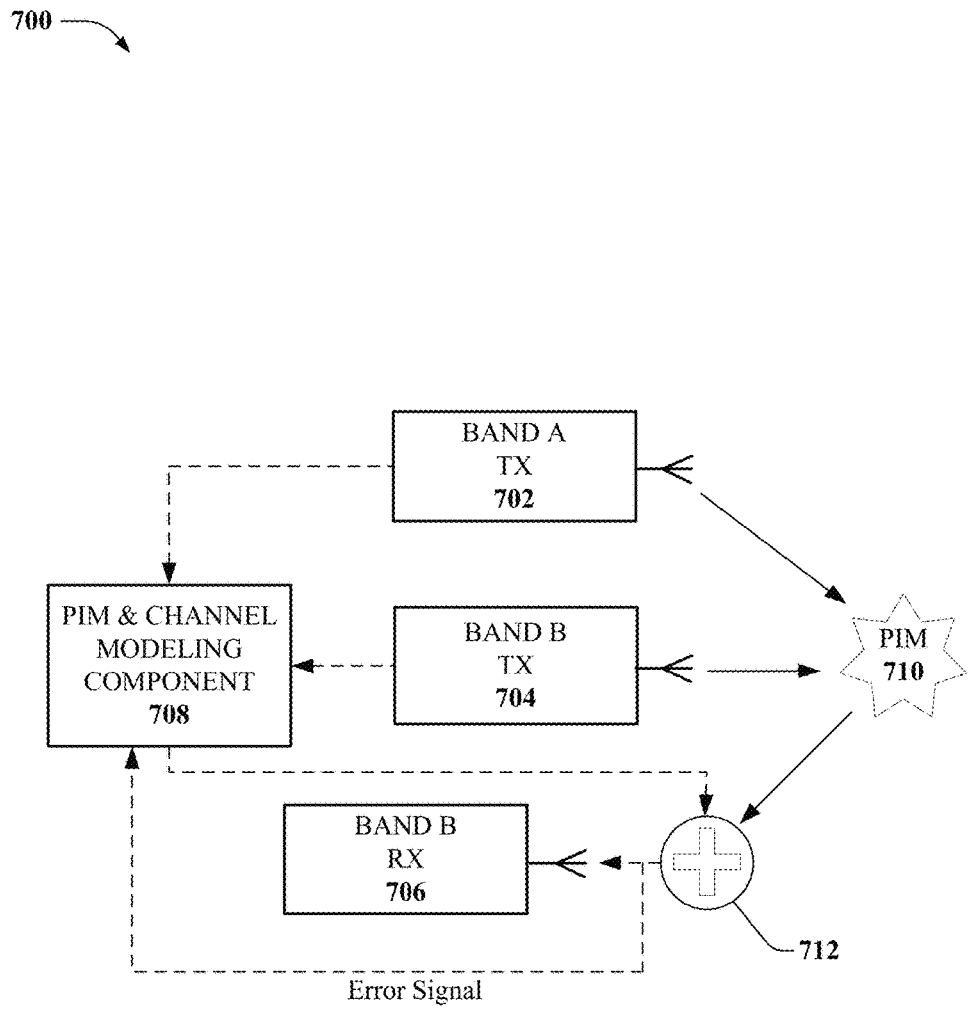
FIG. 7 is an example, non-limiting embodiment of a block diagram showing a passive intermodulation cancellation system in accordance with various aspects described herein.

FIG. 7 is an example, non-limiting embodiment of a block diagram showing a passive intermodulation cancellation system 700 in accordance with various aspects described herein.

In an embodiment, PIM & Channel Modeling component (modeling component) 708 can receive test signals from one or more of Band A or Band B transmitters 702 and 704. In an embodiment, these test signals can also/alternatively be normal data signals sent to one or more mobile devices. The modeling component 708 can take samples from the test signals and model the multipath electromagnetic wave propagation characteristics of the test signals. In an embodiment, the modeling component 708 can model the multipath characteristics prior to the test signals encountering the passive intermodulation 710 and an Nth order nonlinearity (along with an estimated coefficient that is subsequently adaptively iterated) and finally the multipath characteristics between the PIM 710 and the Band B receiver 706.

At each stage, the modeling component 708 can apply an adaptive non-linear filter, and thus the adaptive non-linear filter can be applied for the multipath before the PIM 710, followed by an adaptive non-linear filter modeling the PIM characteristic (extracted from above), followed by an adaptive non-linear filter for the multipath after the non-linearity. In an embodiment, these adaptive nonlinear filters can be performed at 712.

An error signal is generated by subtracting the modeled nonlinearity of the three adaptive filters from the received signal and real PIM product. This generates the error signal which is the error of the model IM product from the real IM product which us used to adapt the filter coefficients. The adaptive filters allows for tracking time varying PIM source 710, multiple PIM sources that start to appear, and allow for convergence of the filters for "bad" initial estimates in an appropriate adaptive coefficient. Using this error signal a PIM model can be generated that can be used to cancel the intermodulation products received in other signals from the PIM 710.

Figure 8:
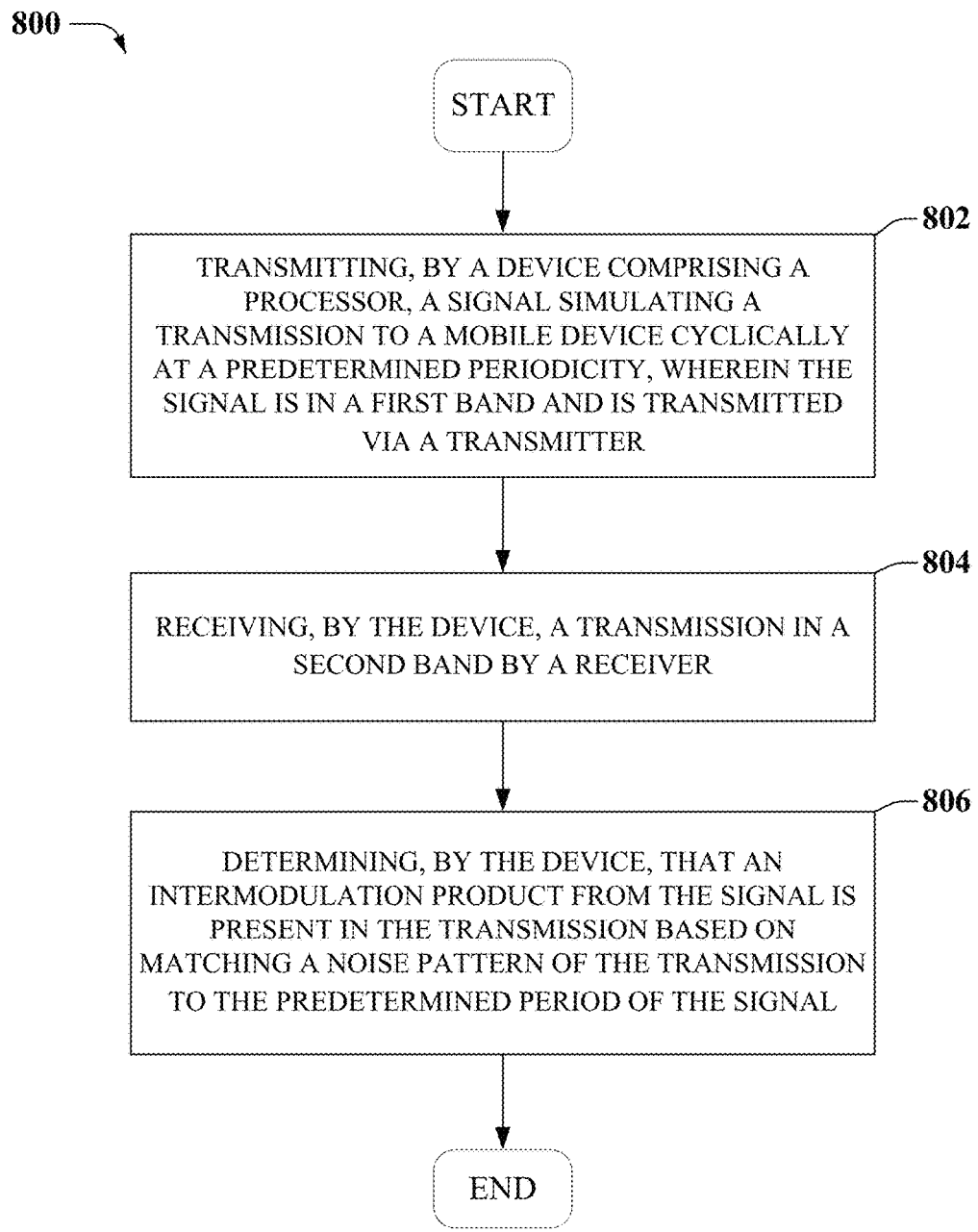
FIG. 8 illustrates a flow diagram of an example, non-limiting embodiment of a method for detecting passive intermodulation as described herein.
Figure 9:
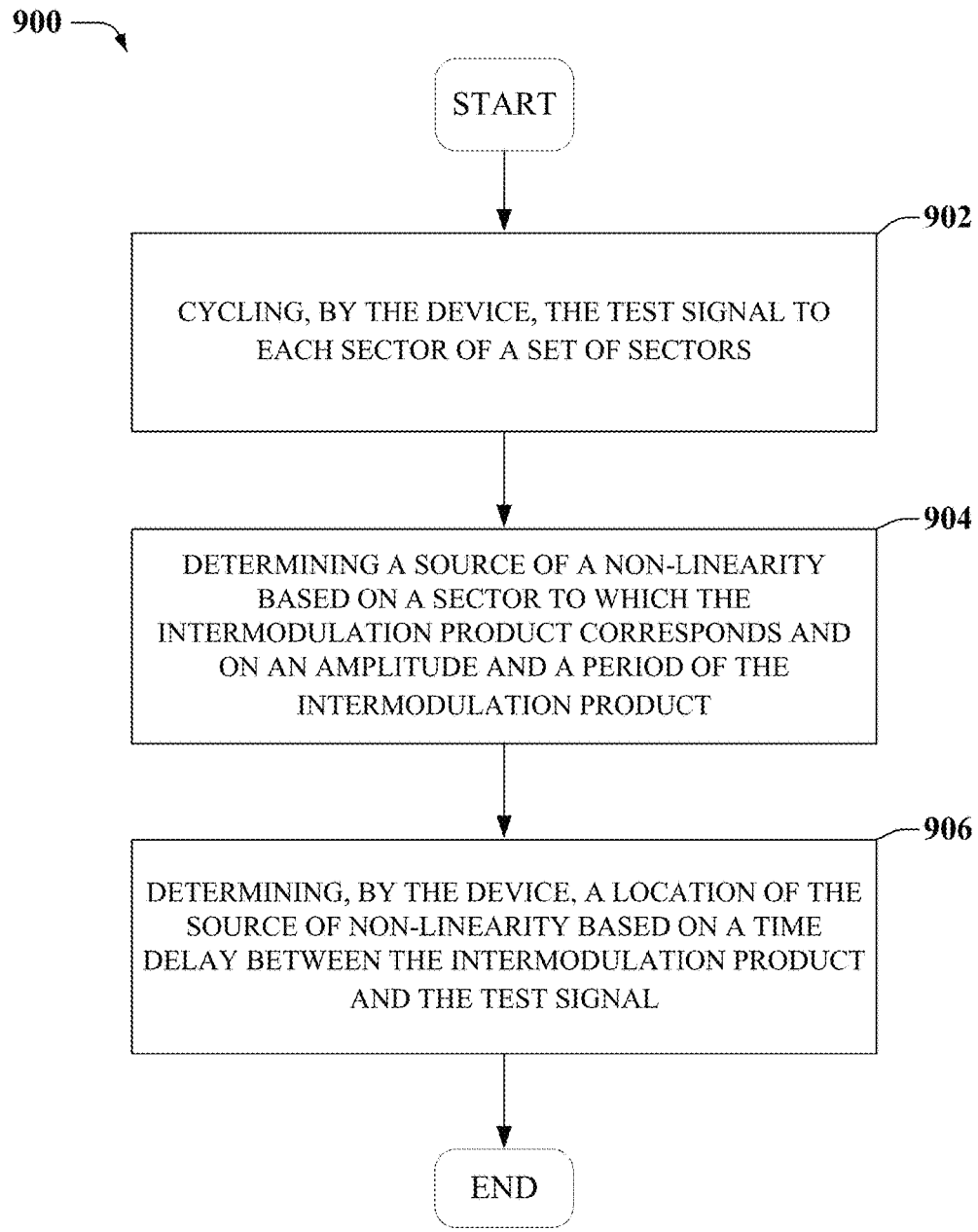
FIG. 9 illustrates a flow diagram of an example, non-limiting embodiment of a method for identifying a source and location of passive intermodulation as described herein.

FIGS. 8-9 illustrates a process in connection with the aforementioned systems. The processes in FIGS. 8-9 can be implemented for example by the systems in FIGS. 1-7. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram 800 of an example, non-limiting embodiment of a method 800 for detecting passive intermodulation as described herein.

Method 800 can begin at 802 where the method includes transmitting, by a device comprising a processor, a signal simulating a transmission to a mobile device cyclically at a predetermined periodicity, wherein the signal is in a first band and is transmitted via a transmitter. The test signal can be generated by a test signal generator and can be configured to simulate a transmission to one or more mobile devices at full load. The test signal can also be sent at half load, or any other partial load increment. The test signal can also be transmitted sequentially to a set of sectors associated with the cell site.

At method step 804, the method includes receiving, by the device, a transmission in a second band by a receiver. At 806, the method includes determining, by the device, that an intermodulation product from the signal is present in the transmission based on matching a noise pattern of the transmission to the predetermined period of the signal. The determination can be performed by an intermodulation detection component that can detect whether the signal, as received at the second antenna includes any intermodulation products from passive intermodulation. In an embodiment, the intermodulation detection component can determine that an intermodulation product from the test signal is present in the transmission based on matching a cyclical noise measurement of the transmission to the defined rate of the test signal. The intermodulation detection component can also distinguish the intermodulation product from adjacent channel interference associated with a signal on an adjacent channel based on the slope of the noise amplitude as a function of frequency. The further the frequency is from the adjacent band, the noise amplitude decreases. By contrast, the intermodulation product from the passive intermodulation has harmonics that show up as increases at regular frequency intervals.

Turning now to FIG. 9, illustrated is a flow diagram 900 of an example, non-limiting embodiment of a method for identifying a source and location of passive intermodulation as described herein.

Method 900 can begin at 902 where the method includes cycling, by the device, the test signal to each sector of a set of sectors.

At 904 the method includes determining a source of a non-linearity based on a sector to which the intermodulation product corresponds. As an example, if while cycling the test signal to a first and second sectors, no passive intermodulation is detected, but passive intermodulation is detected while transmitting the test signal to the third sector, it can be determined that the non-linearity is likely associated with the third sector antennas.

At 906 the method includes determining, by the device, a location of the source of non-linearity based on a time delay between the intermodulation product and the test signal. The test signal generator can generate test signal at predefined time intervals and since the test signal generator and the receiver component or intermodulation detection component can have synchronized clocks or clocks set to a common time, any delay in the appearance of passive intermodulation in the received signal can be noticed and the time delay can indicate a distance of the non-linearities from the antennas.

Figure 10:
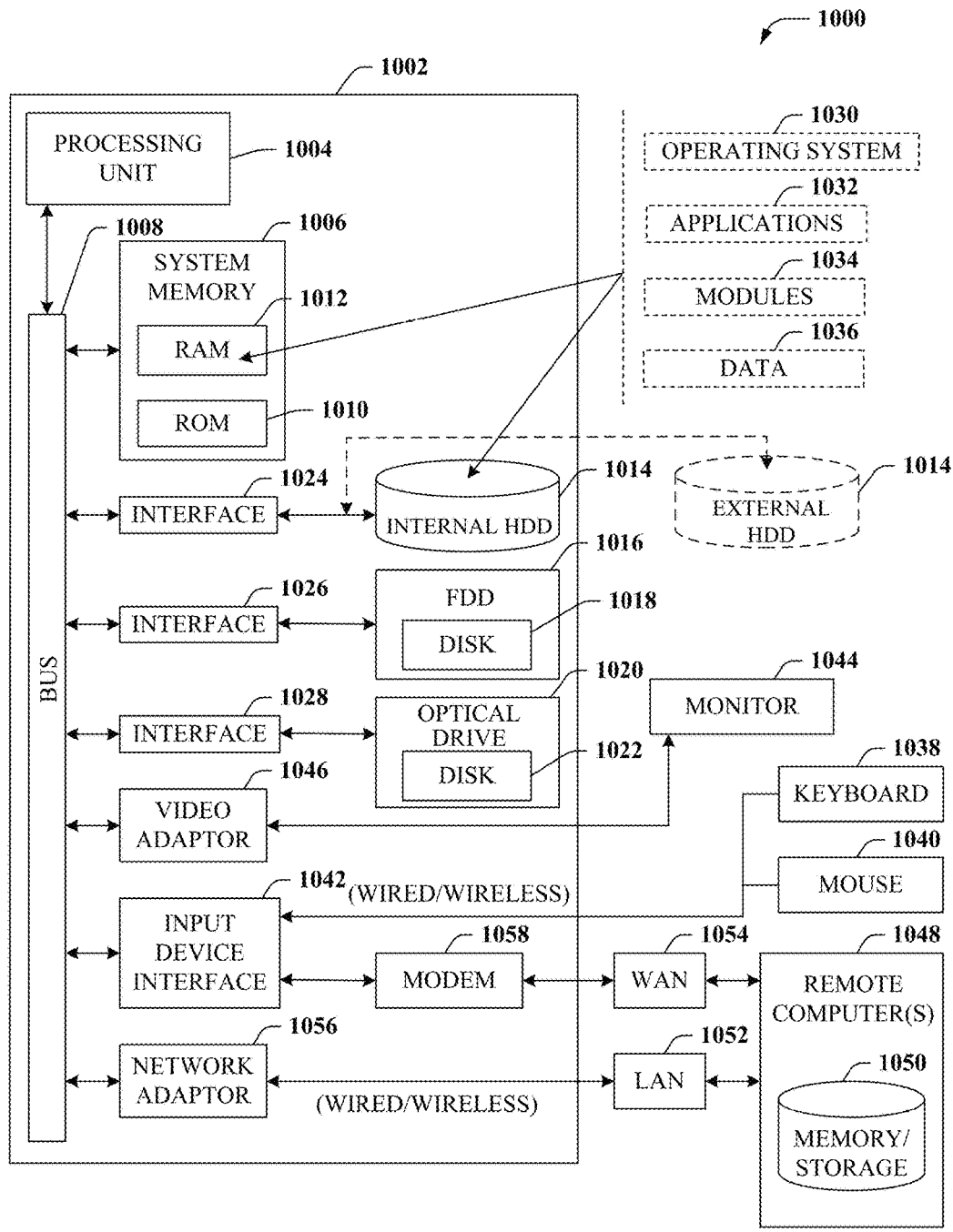
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within the radio repeater system disclosed in any of the previous systems 200, 300, 400, 500, 600, and/or 700.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

In an embodiment of the subject application, the computer 1002 can provide the environment and/or setting in which one or more of the passive intermodulation detection and cancellation systems disclosed in FIGS. 1-7 can be operated from. For instance, the virtual machines disclosed herein can be applications 1032 stored in hard drive 1014 and executed by processing unit 1004.

Figure 11:
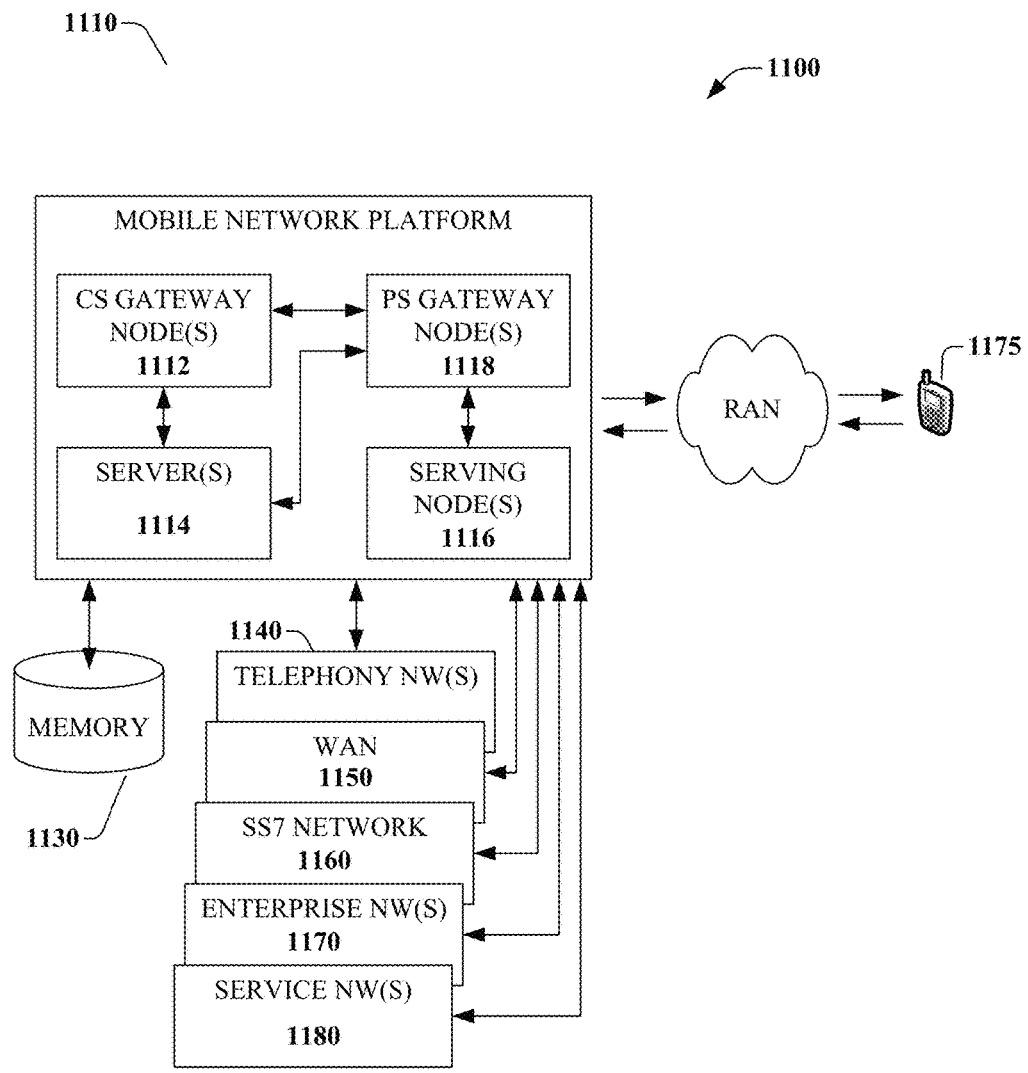
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110.

To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIGS. 10 and 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   cycling a test signal at a defined period, wherein the test signal is in a first band and is transmitted by a transmitter;
   receiving a transmission in a second band by a receiver; and
   determining that an intermodulation product from the test signal is present in the transmission based on matching a period of a cyclical noise measurement of the transmission to the defined period and based on a noise amplitude harmonic identified at a defined frequency gap from the second band.

2. The system of claim 1, wherein the operations further comprise:
   determining a type of a source of non-linearity based on an amplitude and associated frequency period of the intermodulation product.

3. The system of claim 1, wherein the operations further comprise:
   determining an intermodulation model based on the intermodulation product; and
   modifying the transmission to reduce the intermodulation product based on the intermodulation model.

4. The system of claim 1, wherein the operations further comprise:
cycling the test signal to each sector of a group of sectors.

5. The system of claim 1, wherein the operations further comprise:
determining a source of a non-linearity based on a sector to which the intermodulation product corresponds.

6. The system of claim 1, wherein the test signal simulates a cellular transmission from a base station device to a mobile device.

7. The system of claim 2, wherein the operations further comprise:
determining a location of the source of non-linearity based on a phase difference between the intermodulation product and the test signal.

8. The system of claim 6, wherein the modifying the transmission to reduce the intermodulation product based on the intermodulation model further comprises convolving the transmission with an interference minimizing filter.

9. The system of claim 6, wherein the determining the intermodulation model based on the intermodulation product further comprises:
applying a first adaptive nonlinear filter that models first multipath characteristics of the test signal before a non-linearity;
applying a second adaptive nonlinear filter to the test signal;
applying a third adaptive nonlinear filter that models second multipath characteristics of the test signal after the non-linearity;
determining an interference based on combining results of the applying the first, second, and third adaptive nonlinear filters; and
subtracting the interference from the transmission plus the interference.

10. The system of claim 7, wherein the determining the location of the source of the non-linearity further comprises:
determining radial locations of the source of the non-linearity from a group of receivers; and
determining an intersection location of the radial locations.

11. A method, comprising:
transmitting, by a device comprising a processor, a signal simulating a first transmission to a mobile device, wherein the signal is cycled at a predetermined periodicity, wherein the signal is in a first band;
receiving, by the device, a second transmission in a second band by a receiver; and
determining, by the device, that an intermodulation product from the signal is present in the second transmission based on matching a period of the noise pattern of the second transmission to the predetermined period of the signal and based on identifying a noise pattern amplitude harmonic at a predefined frequency gap from the second band.

12. The method of claim 11, further comprising:
determining, by the device, a type of a source of a non-linearity that led to the intermodulation product based on an amplitude and a frequency period of the intermodulation product.

13. The method of claim 11, further comprising:
determining, by the device, an intermodulation model based on the intermodulation product; and modifying, by the device, the second transmission to reduce the intermodulation product based on the intermodulation model.

14. The method of claim 11, further comprising:
cycling, by the device, the signal to each sector of sectors; and
determining a source of a non-linearity based on a sector of the sectors to which the intermodulation product corresponds.

15. The method of claim 12, further comprising:
determining, by the device, a location of the source of non-linearity based on a time delay between the intermodulation product and the signal.

16. The method of claim 13, wherein the determining the intermodulation model based on the intermodulation product further comprises:
applying, by the device, a first adaptive nonlinear filter modeling multipath characteristics of the signal before a non-linearity;
applying, by the device, a second adaptive nonlinear filter to the signal;
applying, by the device, a third adaptive nonlinear filter modeling the multipath characteristics of the signal after the non-linearity; and
combining, by the device, results of the applying the first, second, and third adaptive nonlinear filters.

17. A computer-readable storage device storing executable instructions that, in response to execution, cause a device comprising a processor to perform operations, comprising:
transmitting a test signal simulating a first transmission to a mobile device, wherein the test signal is cycled according to a time period, and wherein the test signal is in a first band and is transmitted via a transmitter;
receiving a second transmission in a second band by a receiver; and
determining that an intermodulation product from the test signal is present in the second transmission based on a match being determined between a period of a noise pattern of the second transmission and the time period and based on a noise pattern amplitude harmonic identified at a defined frequency gap from the second band.

18. The computer-readable storage device of claim 17, wherein the time period is a first time period, and wherein the operations further comprise:
determining a type of a source of a non-linearity that led to the intermodulation product based on an amplitude and a second time period of the intermodulation product.

19. The computer-readable storage device of claim 17, wherein the intermodulation product is a first intermodulation product, and wherein the operations further comprise:
applying a series of adaptive non-linear filters to the test signal and a first received signal to determine an error signal associated with the first intermodulation product; and
subtracting the error signal from a second received signal to reduce a second intermodulation product in the second received signal.

20. The computer-readable storage device of claim 17, wherein the operations further comprise:
cycling the test signal to each sector of a group of sectors.

* * * * *